US011221000B2

(12) United States Patent
Aitken

(10) Patent No.: US 11,221,000 B2
(45) Date of Patent: Jan. 11, 2022

(54) LIFT SYSTEM FOR OPENING A TOP PORTION OF A NACELLE

(71) Applicant: LiftWerx Holdings Inc., Cambridge (CA)

(72) Inventor: Glen D. Aitken, Fergus (CA)

(73) Assignee: LiftWerx Holdings Inc., Cambridge (CA)

(*) Notice: Subject to any disclaimer, the term of this patent is extended or adjusted under 35 U.S.C. 154(b) by 0 days.

(21) Appl. No.: 17/286,914

(22) PCT Filed: Oct. 18, 2019

(86) PCT No.: PCT/CA2019/051474
§ 371 (c)(1),
(2) Date: Apr. 20, 2021

(87) PCT Pub. No.: WO2020/082167
PCT Pub. Date: Apr. 30, 2020

(65) Prior Publication Data
US 2021/0355920 A1    Nov. 18, 2021

Related U.S. Application Data

(60) Provisional application No. 62/749,940, filed on Oct. 24, 2018.

(51) Int. Cl.
*F03D 80/80* (2016.01)
*F03D 13/10* (2016.01)
*F03D 80/50* (2016.01)

(52) U.S. Cl.
CPC ............ *F03D 80/80* (2016.05); *F03D 13/10* (2016.05); *F03D 80/50* (2016.05); *F05B 2230/61* (2013.01); *F05B 2230/80* (2013.01)

(58) Field of Classification Search
CPC .......... F03D 80/50; F03D 80/55; F03D 80/80; F03D 80/82; F03D 80/85; F03D 80/88;
(Continued)

(56) References Cited

U.S. PATENT DOCUMENTS 5,649,392 A * 7/1997 Svenning ................ F03D 80/50
52/66
8,104,631 B2 1/2012 Stegemann et al.
(Continued)

FOREIGN PATENT DOCUMENTS

EP       3246561 A1    11/2017
WO   WO-2012105971 A1 * 8/2012 ............. F03D 80/50

OTHER PUBLICATIONS

International Preliminary Report on Patentability dated Aug. 4, 2020 on PCT application PCT/CA2019/051474.
(Continued)

*Primary Examiner* — Richard A Edgar
(74) *Attorney, Agent, or Firm* — Brunet & Co. Ltd.; Robert Brunet; Hans Koenig

(57) ABSTRACT

A lift system for lifting an openable top portion of a nacelle of a wind turbine has first and second laterally spaced apart jacks pivotally connectable to a bottom portion of the nacelle and the top portion proximate a rear end of the nacelle. The first and second jacks are actuatable to raise and lower a rear of the top portion. The lift system further has a support member pivotally connectable to the bottom portion and the top portion proximate a front end of the nacelle. A front of the top portion is pivotable on the support member when the first and second jacks are actuated without raising or lowering the top portion where the support member is pivotally connected. The lift system permits opening the top portion where the top portion has a U-shaped lip into which a complementary inverted U-shaped lip of a rotor fairing is
(Continued)

inserted, and permits opening substantially rectangular or non-rectangular nacelles.

18 Claims, 17 Drawing Sheets

(58) Field of Classification Search
CPC .............. F05B 2230/61; F05B 2230/80; F05B 2240/14
See application file for complete search history.

(56) References Cited

U.S. PATENT DOCUMENTS

| | | |
|---|---|---|
| 8,118,523 B2 | 2/2012 | Pedersen |
| 9,523,347 B2 | 12/2016 | Skaff et al. |
| 9,845,791 B2 * | 12/2017 | Fenger .................... F03D 80/50 |

OTHER PUBLICATIONS

International Search Report and Written Opinion dated Dec. 19, 2019 on PCT application PCT/CA2019/051474.

* cited by examiner

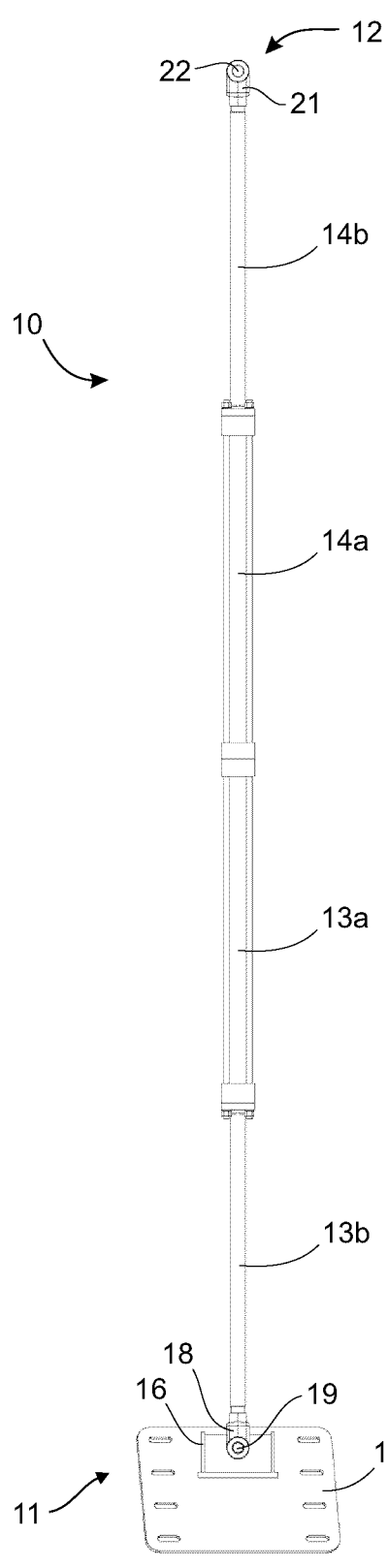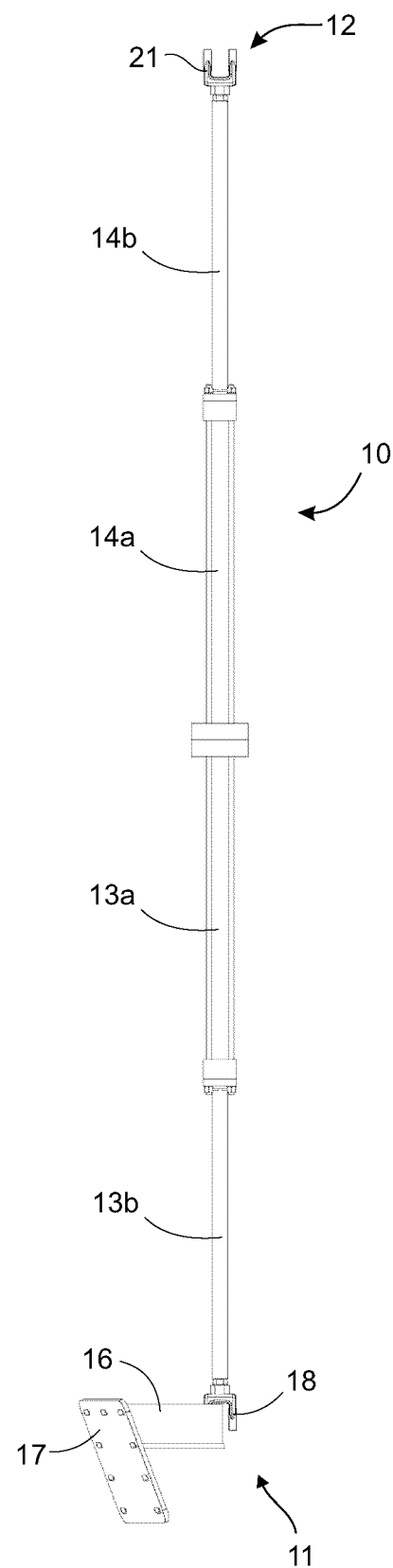
Fig. 7C
Fig. 7D

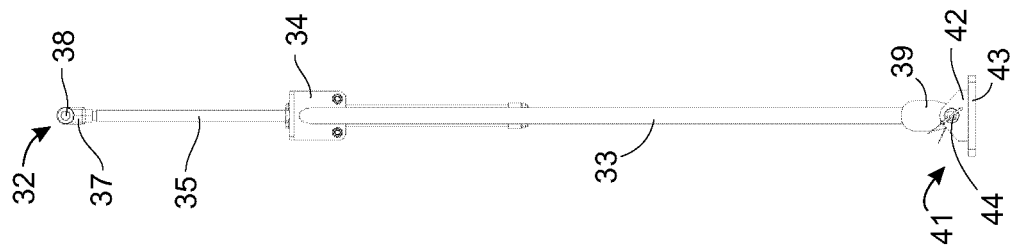
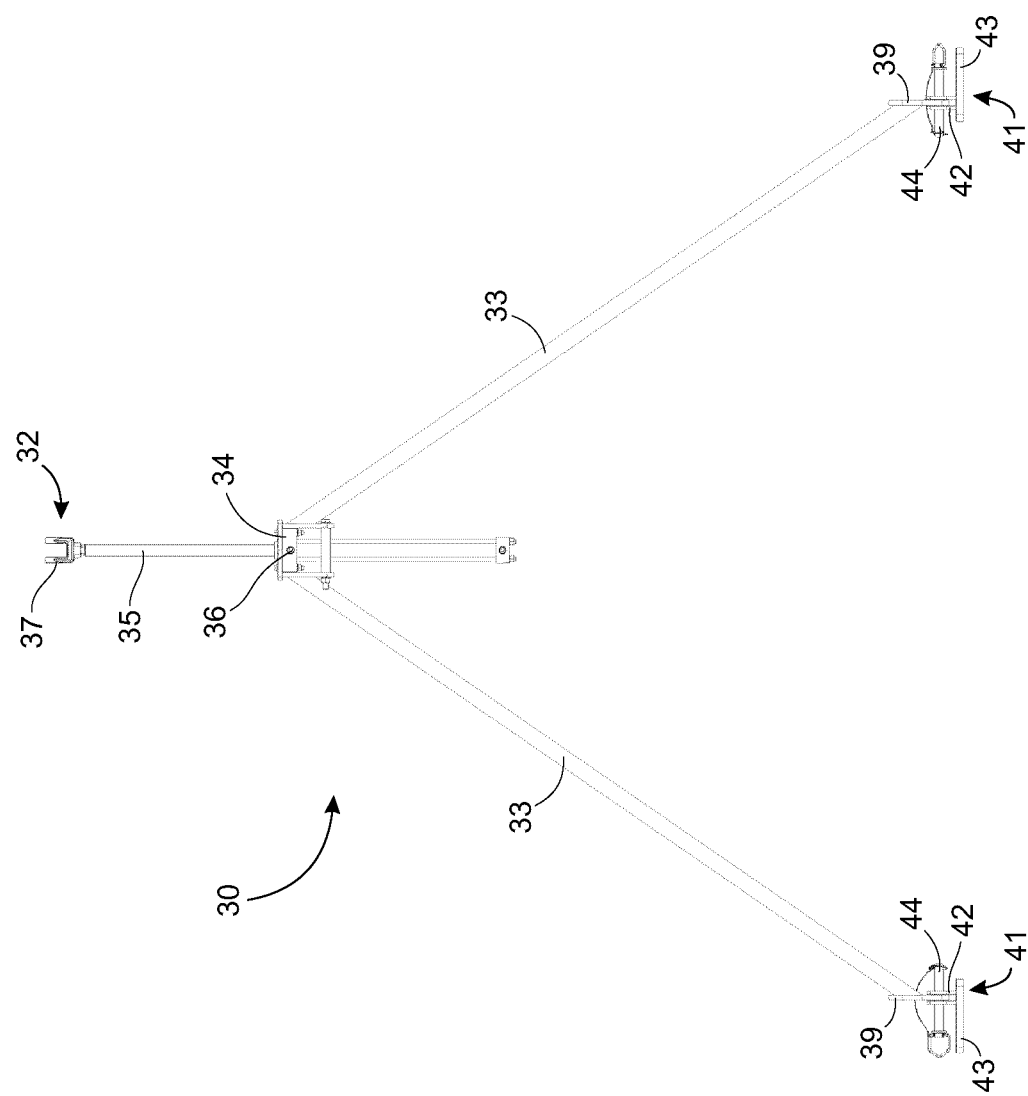
Fig. 8B
Fig. 8A

LIFT SYSTEM FOR OPENING A TOP PORTION OF A NACELLE

CROSS-REFERENCE TO RELATED APPLICATIONS

This application is a national entry of PCT/CA2019/051474 filed Oct. 18, 2019, which claims priority to United States Provisional Application U.S. Ser. No. 62/749,940 filed Oct. 24, 2018.

FIELD

This application relates to wind turbines, in particular to a lift system and method for opening a lid of a nacelle of a wind turbine.

BACKGROUND

In order to remove and/or service large wind turbine components, e.g. generators, main shafts, main bearings, gearboxes and the like, located in a nacelle atop a tower of the wind turbine, the nacelle must be opened sufficiently to be able to remove the turbine components and/or to be able to mount a crane on the nacelle for handling the turbine components. Many types of nacelles are constructed in two portions, a bottom portion and an openable top portion (i.e. a lid). The top and bottom portions of the nacelle are attached to one another via bolts at respective rims through internal flanges running along the rims of the top and bottom portion along both sides of the nacelle. To open the top portion, the bolts are removed and a large ground-based crane is sometimes used to lift off the top portion.

To avoid the expense of employing a ground-based crane, jacking systems have been developed, which can be raised up to the nacelle and mounted inside the nacelle to lift the top portion off the bottom portion. Such jacking systems are typified by U.S. Pat. No. 9,845,791 issued Dec. 19, 2017 to Liftra IP ApS. Such prior art jacking systems comprise four jacks mounted to the lower portion of the nacelle and engaged with the roof of the top portion of the nacelle. Once the bolts connecting the flanges of the top and bottom portions are removed, the top portion is raised by the four jacks and spacers are inserted between the two portions. The four jacks are then lowered and rollers are installed on the sides of the jacks between the two nacelle portions. The rollers are engaged with the underside of the flange of the top portion of the nacelle. A top roller is then installed above the flange of the top portion thereby providing a roller both below and above the flange of the top portion of the nacelle. The top roller prevents the top portion from being blown off the nacelle in the event of a sudden wind gust. The top portion can then be slid back along the bottom rollers providing access to the interior of the nacelle from above in order to perform maintenance on the turbine components.

However, such prior art systems suffer from the inability to work with types of nacelles that include a U-shaped lip on a front of the top portion into which a complementary inverted U-shaped lip of a rotor fairing is inserted. The U-shaped lip of the top portion prevents rain intrusion into the nacelle. In order for the complementary U-shaped lips to be disengaged from one another prior to sliding back the top portion of the nacelle, a rear of the top portion of the nacelle must be raised by about two meters and then slid back by about 6-12 inches in order to "unhook" the top portion of the nacelle from the rotor fairing. Furthermore, such prior art systems are designed only to work on nacelles which have a substantially rectangular shape, whereby the side walls of the nacelle are substantially parallel.

There remains a need for a lift system that can conveniently open a top portion of a nacelle of a wind turbine when the nacelle has a U-shaped lip on a front of the top portion into which a complementary inverted U-shaped lip of a rotor fairing is inserted. There further remains a need for a lift system that is able to open a top portion of a nacelle of a wind turbine when the nacelle has a either a substantially rectangular shape or a non-rectangular shape.

SUMMARY

In one aspect, there is provided a lift system for opening an openable top portion of a nacelle of a wind turbine, the lift system comprising: first and second laterally spaced apart jacks pivotally connectable to a bottom portion of a nacelle and pivotally connectable to a top portion of the nacelle proximate a rear end of the nacelle, the first and second jacks actuatable to raise and lower a rear of the top portion of the nacelle; and, a support member pivotally connectable to the bottom portion of the nacelle and pivotally connectable to the top portion of the nacelle proximate a front end of the nacelle, a front of the top portion of the nacelle pivotable on the support member when the first and second jacks are actuated to raise or lower the rear of the top portion.

In another aspect, there is provided a method of opening a nacelle of a wind turbine, the nacelle having an openable top portion connected to a rotor hub through complementary connecting brackets, the method comprising: installing first and second jacks inside the nacelle proximate a rear of the nacelle by pivotally connecting the jacks to a bottom portion and the top portion of the nacelle at laterally spaced apart positions in the nacelle; installing a support member inside the nacelle proximate a front of the nacelle by pivotally connecting the support member to the bottom portion and pivotally connecting the support member to the top portion in the nacelle; disconnecting the top portion from the bottom portion along complementary rims of the top and bottom portion; operating the jacks to lift a rear of the top portion thereby causing a front of the top portion to pivot on the support member to tilt the top portion thereby causing the complementary connecting brackets to disconnect; and, shifting the top portion rearward after the complementary connecting brackets are disconnected.

In another aspect, there is provided a method of opening a nacelle of a wind turbine, the nacelle having an openable top portion and having either a substantially rectangular shape or a non-rectangular shape, the method comprising: installing first and second jacks inside the nacelle proximate a rear of the nacelle by pivotally connecting the jacks to a bottom portion and the top portion of the nacelle at laterally spaced apart positions in the nacelle; installing a support member inside the nacelle proximate a front of the nacelle by pivotally connecting the support member to the bottom portion and pivotally connecting the support member to the top portion in the nacelle; disconnecting the top portion from the bottom portion along complementary rims of the top and bottom portion; operating the jacks to lift a rear of the top portion thereby causing a front of the top portion to pivot on the support member to tilt the top portion; and, shifting the top portion rearward.

The lift system utilizes a three-point lifting arrangement inside the nacelle, two points proximate the rear of the nacelle where the jacks connect two points of the bottom portion of the nacelle to two points of an underside of the top portion of the nacelle, and one point proximate the front of the nacelle where the support member connects two points of the bottom portion of the nacelle to one point of an underside of the top portion of the nacelle.

In some embodiments, the jacks and the support member are pivotally connectable to the bottom and top portions by laterally and horizontally oriented pivot pins. In some embodiment, the jacks are pivotally connectable to an underside of the top portion at laterally spaced apart positions. In some embodiments, the support member is pivotally connectable to the underside of the top portion at a single position.

In some embodiments, the support member is a support frame comprising a mounting collar, two legs connected to the mounting collar and an upwardly oriented strut connected to the mounting collar. The legs may be connected to and extend angularly downwardly from the mounting collar. The legs may have bottom ends that are pivotally connectable to the bottom portion of the nacelle at laterally spaced apart locations. The strut may extend upwardly from the mounting collar. The strut may have a top end that is pivotally connectable to the top portion of the nacelle. The strut may be releasably secured in the mounting collar so that a vertical position of the strut is adjustable.

In some embodiments, the lift system may further comprise rollers mountable on a top rim of the bottom portion to receive a bottom rim of the top portion when the rear of the top portion is lowered. The rollers may further permit longitudinal translation of the top portion when the bottom rim of the top portion us supported on the rollers. In some embodiments, the rollers may be comprised in roller carriages mountable on the top rim of the bottom portion. The roller carriages may comprise retainers securely mountable on the bottom portion of the nacelle. The retainers may pivotally connect the roller carriages to the bottom portion to hold the roller carriages on the top rim of the bottom portion while permitting the roller carriages to translate along the top rim.

In some embodiments, the lift system may further comprise sliding plates mountable on the top rim of the bottom portion proximate a rear of the bottom portion. The sliding plates may receive the bottom rim of the top portion when the rear of the top portion is lowered. The sliding plates may further permit longitudinal translation of the top portion when the bottom rim of the top portion us supported on the sliding plates.

In some embodiments of the method, after the complementary connecting brackets are disconnected, the method may further comprise installing rollers on the rim of the bottom portion. In some embodiments of the method, after the top portion is shifted rearward, the method may further comprise lowering the rear of the top portion so that the rim of the top portion rests on the rollers. In some embodiments, the method may further comprise moving the top portion rearward on the rollers to more fully open the nacelle.

In some embodiments of the method, after the complementary connecting brackets are disconnected, the method may further comprise installing sliding plates on the rim of the bottom portion proximate a rear of the bottom portion. In some embodiments, after the top portion is shifted rearward, the method may further comprise lowering the rear of the top portion so that the rim of the top portion rests on the sliding plates.

In some embodiments of the method, the complementary connecting brackets may comprise a first U-shaped lip on a front of the top portion of the nacelle and a second U-shaped lip on a rotor fairing at a rear of the rotor hub.

The lift system and method are especially useful for opening the top portion of a nacelle where the top of the nacelle is latched to a hub of the wind turbine at the front of the nacelle by a U-shaped bracket. With the lift system, the rear of the top portion is lifted, the front of the top portion pivots on the support member and the U-shaped bracket unhooks from a complementary U-shaped bracket on the hub during pivoting. With the rear of the top portion lifted up and the bracket unhooked from the hub, an operator in the nacelle can shift the top portion a short distance (e.g. about 6-12 inches) to the rear so that the bracket clears the hub. Rollers may be installed on a rim of the bottom portion of the nacelle and the top portion lowered down on to the rollers. The jacks and support member may then be removed and the top portion may be slid further to the rear of the nacelle so that turbine components in the nacelle (e.g. generator, main shaft, main bearing, gearbox, etc.) can be accessed from above.

The lift system is also useful for opening the top portion of a nacelle having either a substantially rectangular shape or a non-rectangular shape, thereby providing the ability to open the top portion of a wider variety of nacelles.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 7C depicts the jack of FIG. 7A in an extended configuration;

FIG. 7D depicts the jack of FIG. 7B in an extended configuration;

FIG. 8A depicts a front view of the support member shown in FIG. 2A;

FIG. 8B depicts a side view of the support member of FIG. 8A;

DETAILED DESCRIPTION

In the present specification, a longitudinal direction is defined as a direction parallel to a major axis of the nacelle, the major axis of the nacelle running a length of the nacelle and through a hub of the wind turbine. A lateral direction is defined as a direction perpendicular to the longitudinal direction in a horizontal plane with respect to the ground.

Figure 1:
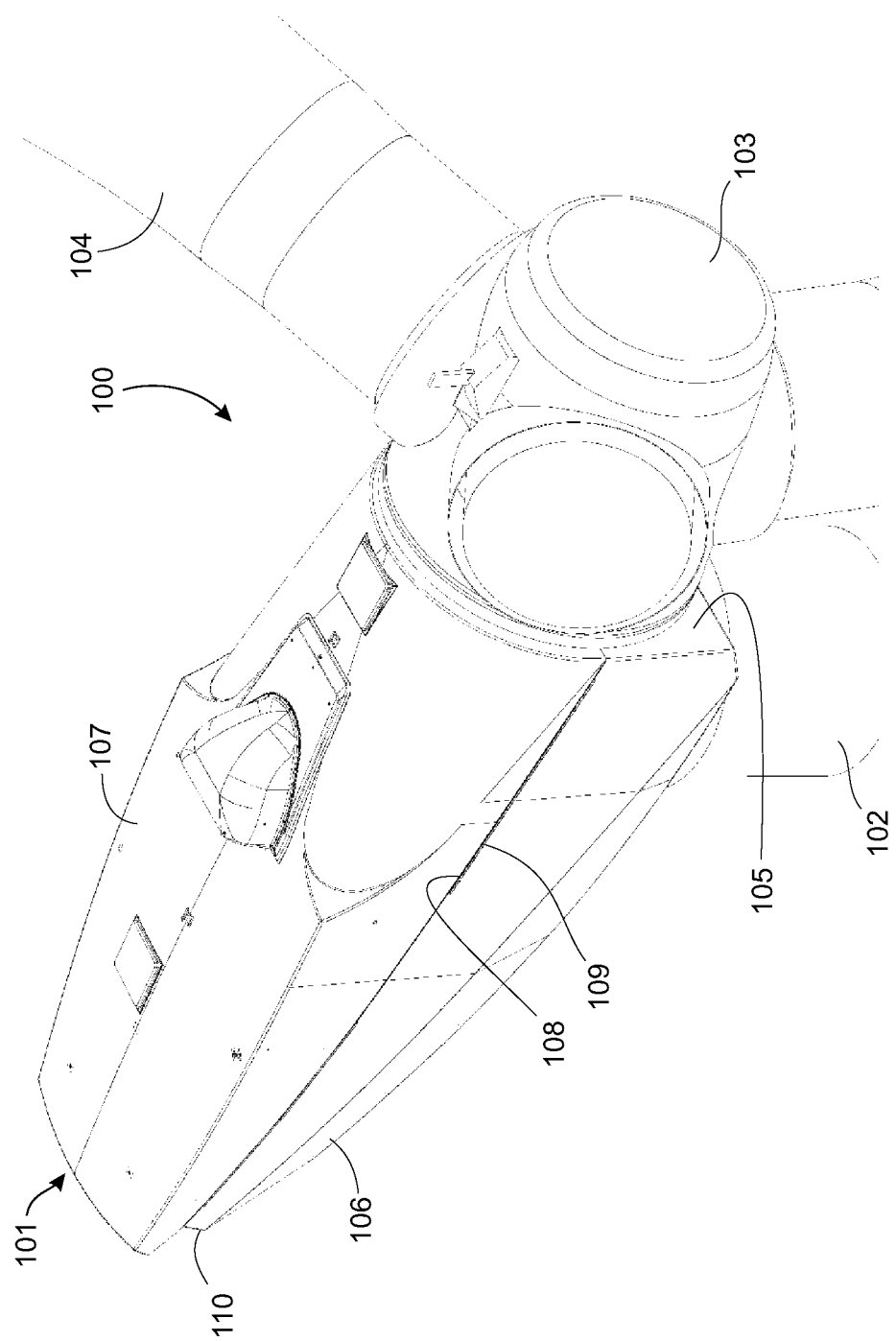
FIG. 1 depicts a wind turbine having a nacelle comprising a U-shaped lip on a front of an openable top portion of the nacelle into which a complementary inverted U-shaped lip of a rotor fairing on a hub of the wind turbine is inserted, the nacelle shown closed.

Referring to FIG. 1, a wind turbine 100 comprises a two-part nacelle 101 mounted atop a tower 102, a rotor hub 103 mounted on a front end 105 of the nacelle 101 and rotor blades 104 (only one labeled) mounted on the rotor hub 103. The nacelle 101 comprises a bottom portion 106 mounted on the tower 102 and an openable top portion 107 acting as a lid to cover turbine components (e.g. generator, main shaft, main bearing, gearbox, etc.) housed inside the nacelle 101. A bottom rim 108 of the top portion 107 comprises a flange that is supported on and bolted to a corresponding flange on a top rim 109 of the bottom portion 106. The top portion 107 is therefore supported on and secured to the bottom portion 106 under normal operating conditions. The top portion 107 of the nacelle 101 is also removably but sealingly connected at the front end 105 to the hub 103 as described more fully below in connection with FIG. 9A to FIG. 9E. The nacelle 101 as shown in FIG. 1 is closed while one or more operators inside the nacelle 101 can erect a lift system 1 (see FIG. 2A, FIG. 2B and FIG. 2C) to assist in lifting and translating the top portion 107 to provide access from above to the turbine components in the nacelle 101.

Figure 2A:
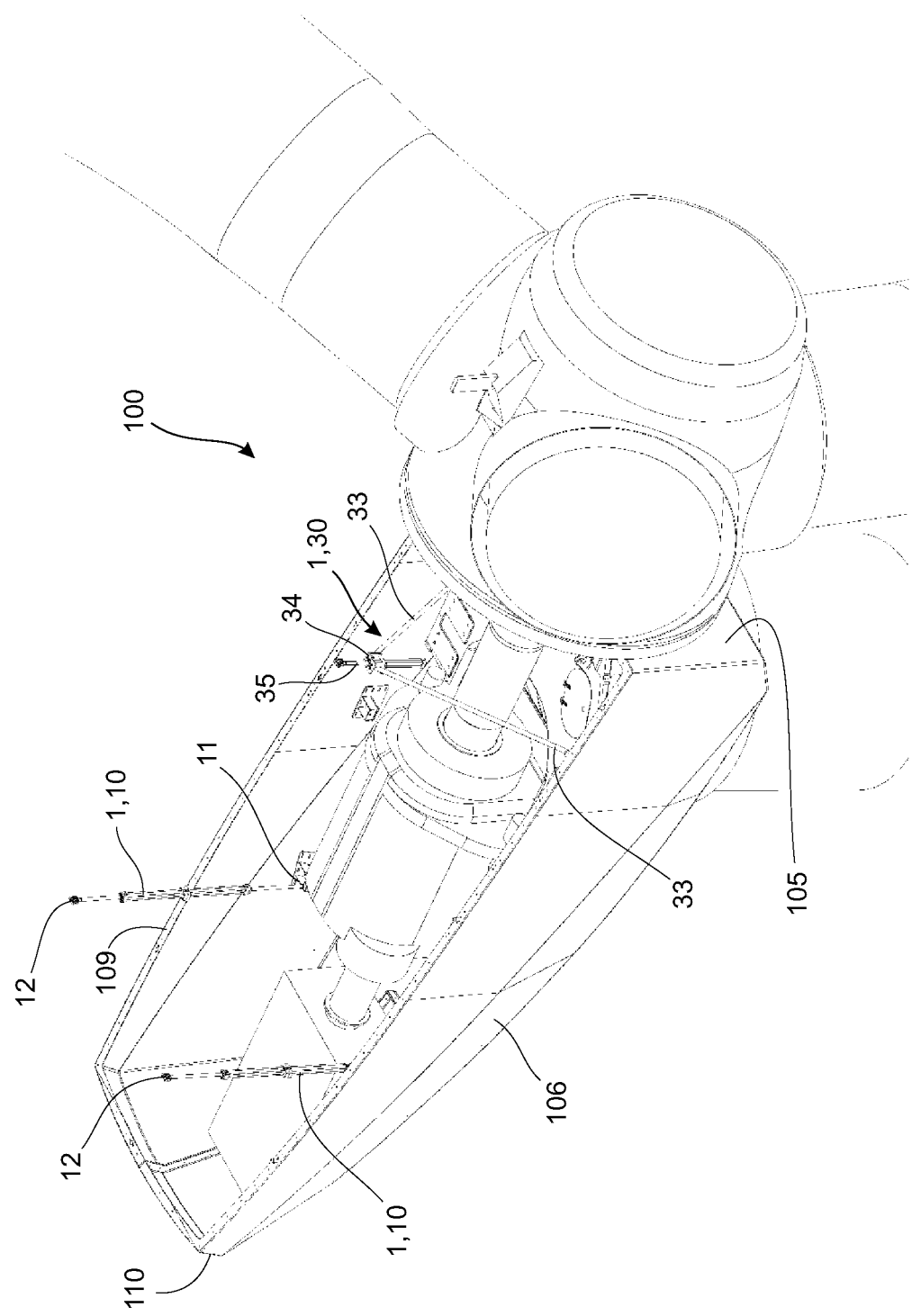
FIG. 2A depicts the wind turbine of FIG. 1 with the top portion of the nacelle not shown to illustrate placement in the nacelle of a support member and two jacks of a lift system of the present invention.

Referring specifically to FIG. 2A, with the nacelle 101 closed, the one or more operators erect the lift system 1 by first mounting a pair of jacks 10 and a support frame 30 in the nacelle 101.

The jacks 10 are erected proximate a rear end 110 of the nacelle 101 and are laterally spaced apart across a width of the nacelle 101 to be on opposite sides of the nacelle 101. Bottom ends 11 of the jacks 10 are pivotally mounted on the bottom portion 106 of the nacelle 101, the jacks 10 oriented upwardly toward the top portion 107 with top ends 12 of the jacks 10 pivotally mounted on the underside of the top portion 107. The jacks 10 are operable to extend and retract to permit lifting and lowering a rear of the top portion 107 once the bolts securing the top portion 107 to the bottom portion 106 are removed. The jacks 10 are horizontally pinned at the top and bottom ends 11, 12, respectively, to permit some longitudinal translation of the top portion 107 once the bolts securing the top portion 107 to the bottom portion 106 are removed. Further features of the jacks 10 are described below in connection with FIG. 7A to FIG. 7D.

The support frame 30 is erected proximate the front end 105 of the nacelle 101. The support frame 30 comprises two legs 33 that are pivotally mounted on the bottom portion 106 of the nacelle 101 at mounting points that are laterally spaced apart across a width of the nacelle 101 on opposite sides of the nacelle 101. The two legs 33 meet at and are connected to a mounting collar 34, the mounting collar 34 located generally centrally between side edges of the nacelle 101. The two legs 33 form an angle with the mounting collar 34 at an apex so that the support frame 30 has an inverted V-shape. An upwardly oriented strut 35 extending through and releasably secured in the mounting collar 34 has a top end 32 pivotally mounted on the underside of the top portion 107. The legs 33 and the strut 35 are horizontally pinned to the bottom and top portions 106, 107, respectively, to permit pivoting of the top portion 107 at the top end 32 of the strut 35 once the bolts securing the top portion 107 to the bottom portion 106 are removed. The strut 35 is releasably secured in the mounting collar 34 so that a vertical position of the strut 35 in the mounting collar 34 can be adjusted to accommodate the height of the underside of the top portion 107. Further features of the support frame 30 are described below in connection with FIG. 8A and FIG. 8B.

Figure 3:
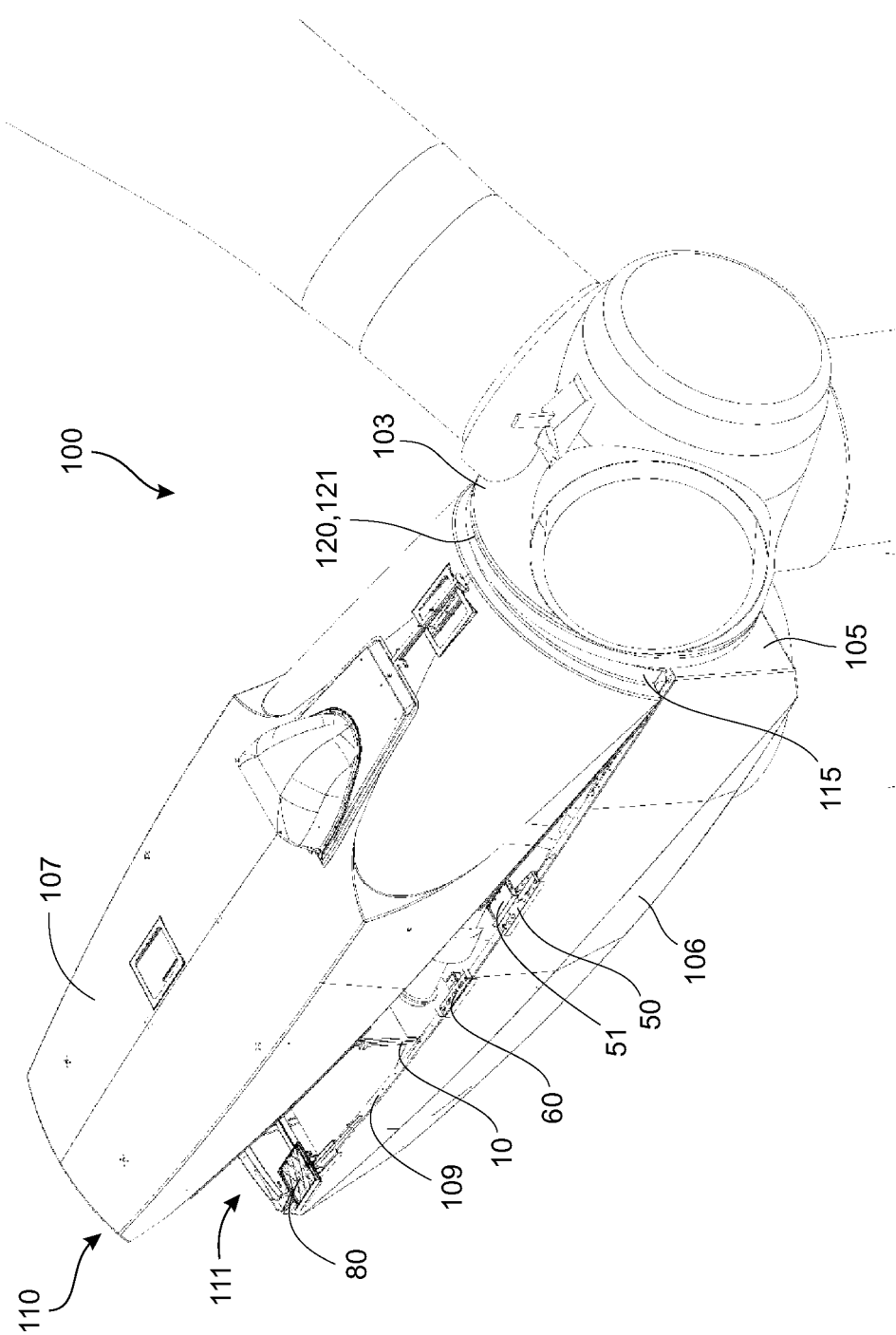
FIG. 3 depicts the wind turbine of FIG. 1 with a rear end of the top portion of the nacelle raised by lift system of the present invention.

After removing the bolts that secure the top portion 107 to the bottom portion 106, jacks 10 are operated to extend thereby lifting the rear of the top portion 107 while the front of the top portion 107 pivots on the support frame 30, as seen in FIG. 3. Thus, the top portion 107 becomes angled with respect to the bottom portion 106 creating a gap 111 between the bottom rim 108 of the top portion 107 and the top rim 109 of the bottom portion 106, the gap 111 becoming increasingly larger toward the rear end 110 of the nacelle.

Figure 2B:
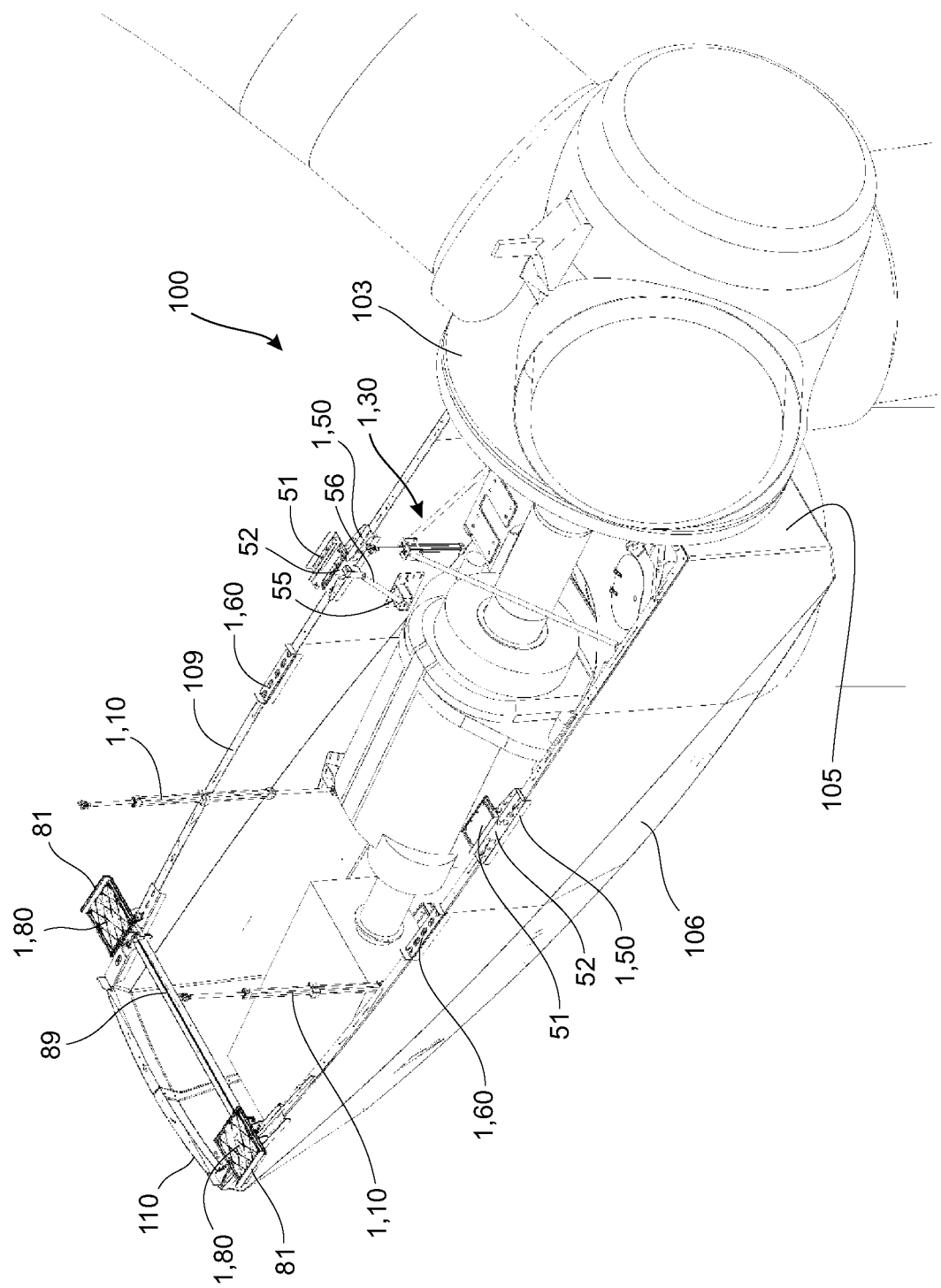
FIG. 2B depicts the wind turbine of FIG. 2A further showing roller carriages with rollers, as well as other elements of the lift system installed on a bottom portion of the nacelle.
Figure 2C:
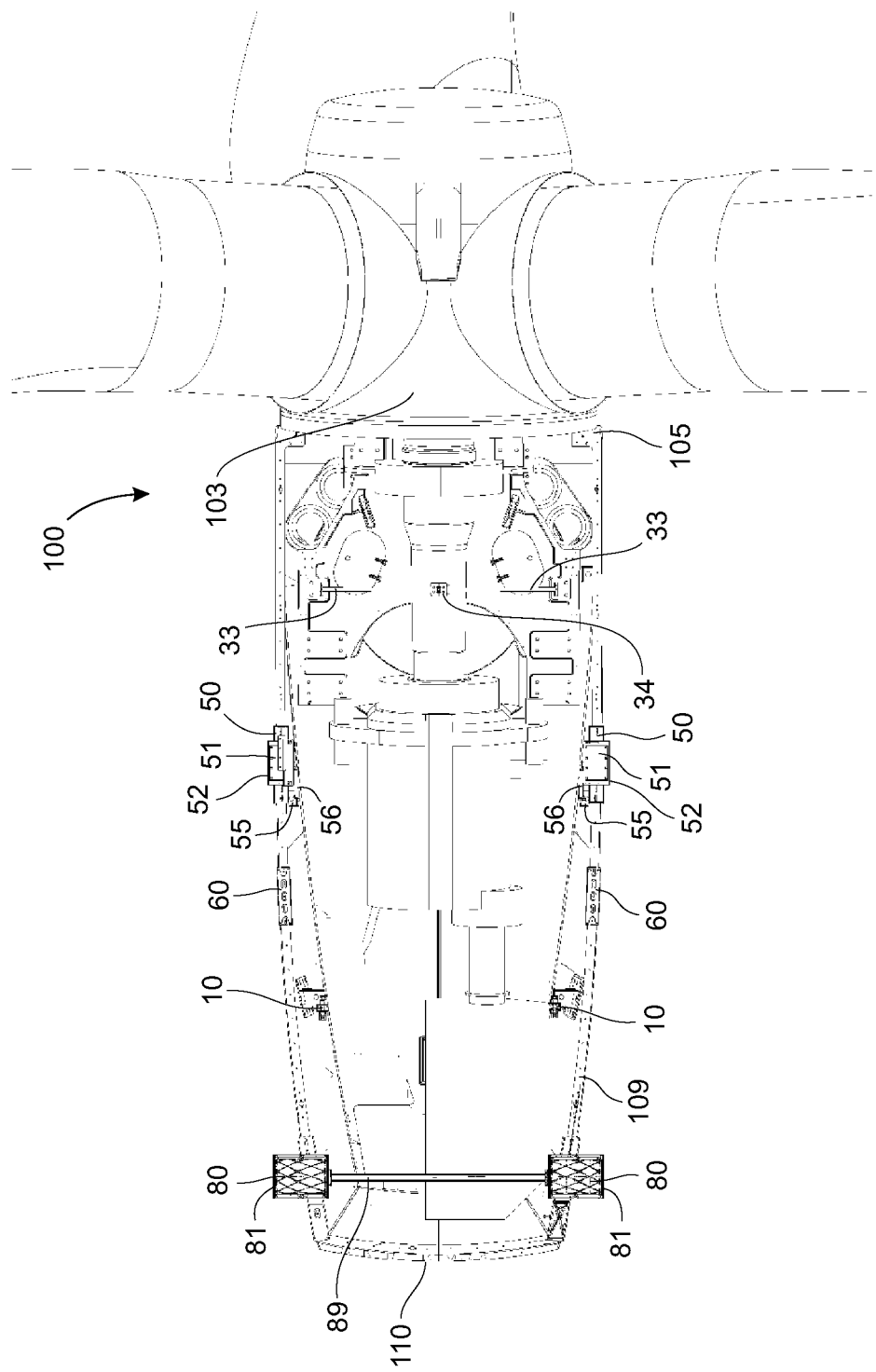
FIG. 2C depicts a top view of FIG. 2B.

With specific reference to FIG. 2B and FIG. 2C, the one or more operators now have the opportunity to install further components of the lift system 1 on the top rim 109 of the bottom portion 106, including roller carriages 50, spacers 60 and sliding plates 80. The roller carriages 50 comprise rollers 51 on which the bottom rim 108 of the top portion 107 can slide when the rear of the top portion 107 is lowered by the jacks 10. The rollers 51 may be mounted in a walled cradle 52 of the roller carriage 50 to help prevent lateral movement of the top portion 107 when the top portion 107 is supported on the roller carriages 50. The roller carriages 50 further comprise retainers 55 securely mounted on the bottom portion 106 of the nacelle 101. The retainers 55 comprise pivotable connecting rods 56 pivotally connecting the retainers 55 to the cradles 52. The retainers 55 hold the cradles 52 down on the top rim 109 of the bottom portion 106 while permitting the cradles 52 to translate a small amount along the top rim 109 to provide some flexibility to the position of the rollers 51 relative to the bottom rim 108 of the top portion 107 to prevent jamming of the bottom rim 108 as the top portion 107 slides on the rollers 51. The sliding plates 80 are mounted on the top rim 109 of the bottom portion 106 proximate the rear of the bottom portion 109. The sliding plates 80 also receive the bottom rim 108 of the top portion 107 when the jacks 10 lower the rear of the top portion 107. As the top portion 107 is moves longitudinally, the sliding plates 80 support the top portion 107. The sliding plates 80 comprise raised lips 81 on outward edges, the raised lips 81 containing the top portion 107 on the sliding plates 80 by preventing excessive lateral movement of the top portion 107 while permitting some lateral movement to prevent jamming of the top portion 107 as the top portion 107 is translated longitudinally. The sliding plates 80 are connected across a width of the bottom portion 106 by a brace 89 to provide further structural support for the sliding plates 80. The spacers 60 help prevent the bottom rim 108 of the top portion 107 from contacting the top rim 109 of the bottom portion 106 between the roller carriages 50 and the sliding plates 80.

Each of the jacks 10 has a combined length and stroke length that is sufficient to raise the rear of the top portion 107 enough to permit installation of the other components 50, 60, 80 of the lift system 1 on the top rim 109 of the bottom portion 106, and importantly to result in unhooking of the front of the top portion 107 from the hub 103 when the jacks 10 are extended. In one embodiment, the jacks 10 are about 8 feet long and have a stroke length of about 7 feet.

Figure 4:
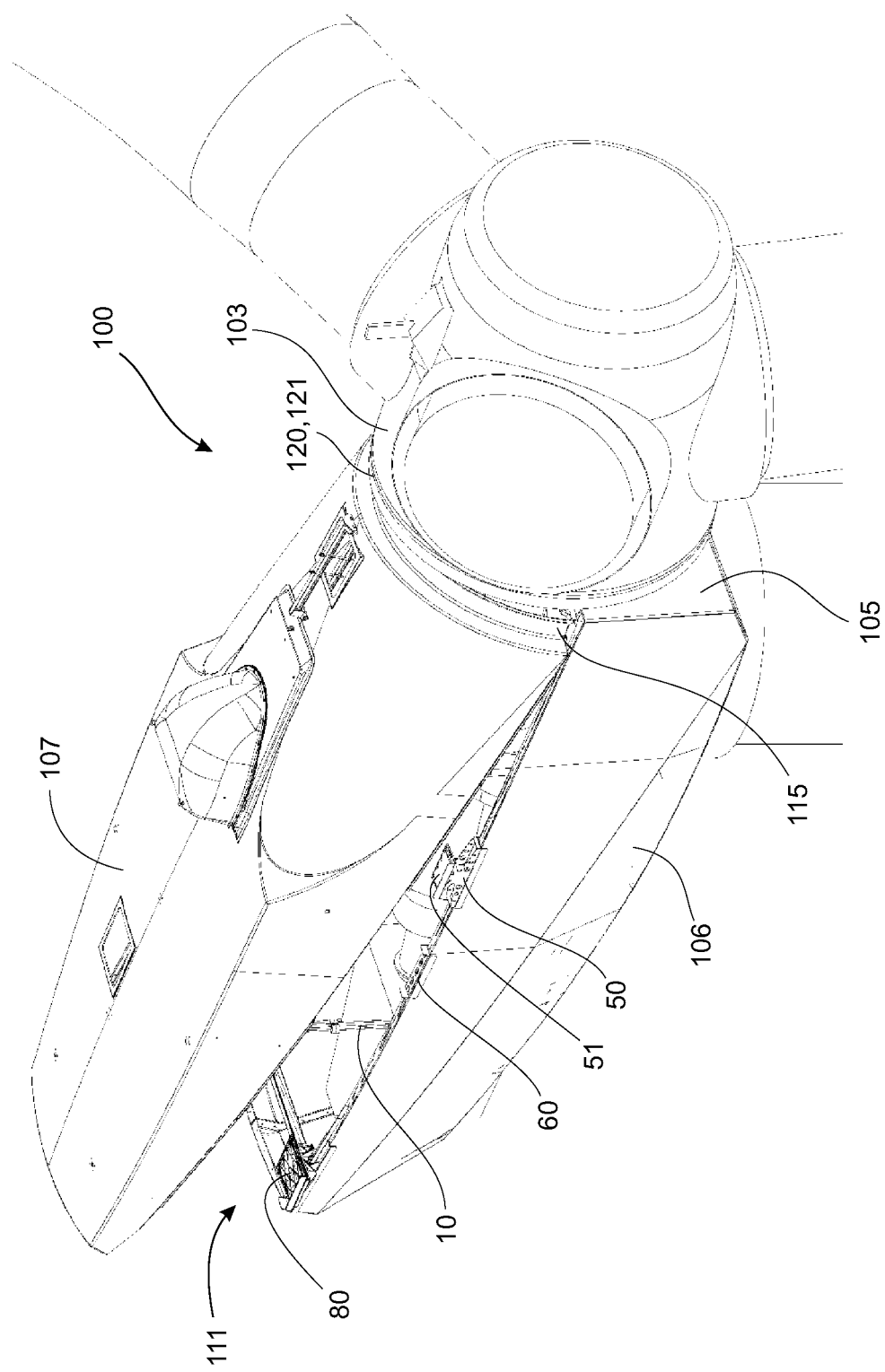
FIG. 4 depicts the wind turbine of FIG. 3 with the top portion of the nacelle moved rearwardly by about 6 inches so that the U-shaped lip on the front of the top portion is clear of the complementary inverted U-shaped lip of the rotor fairing.
Figure 5:
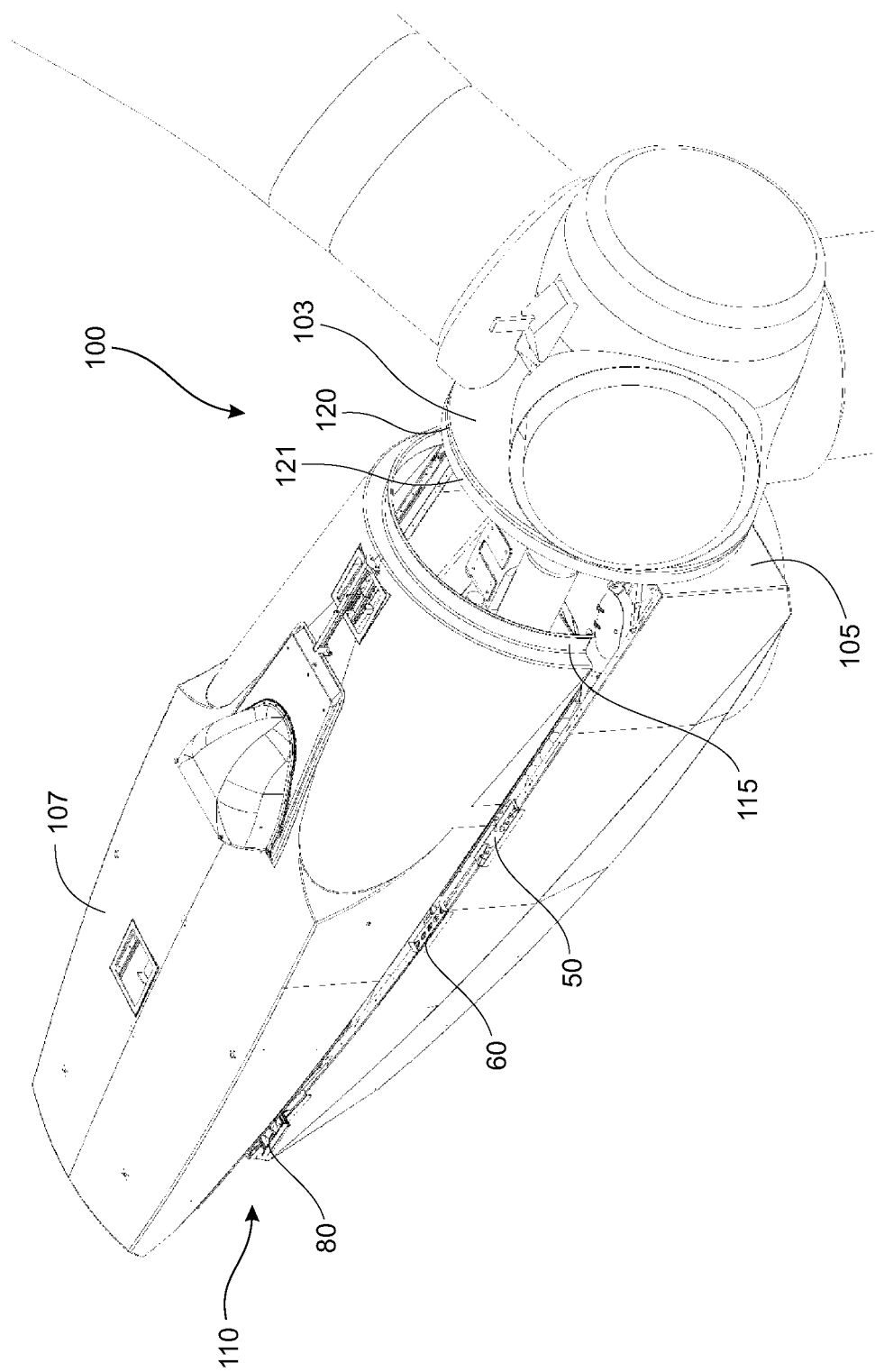
FIG. 5 depicts the wind turbine of FIG. 4 with the rear end of the top portion of the nacelle lowered and lower edges of the top portion supported on the rollers of the roller carriages.
Figure 6A:
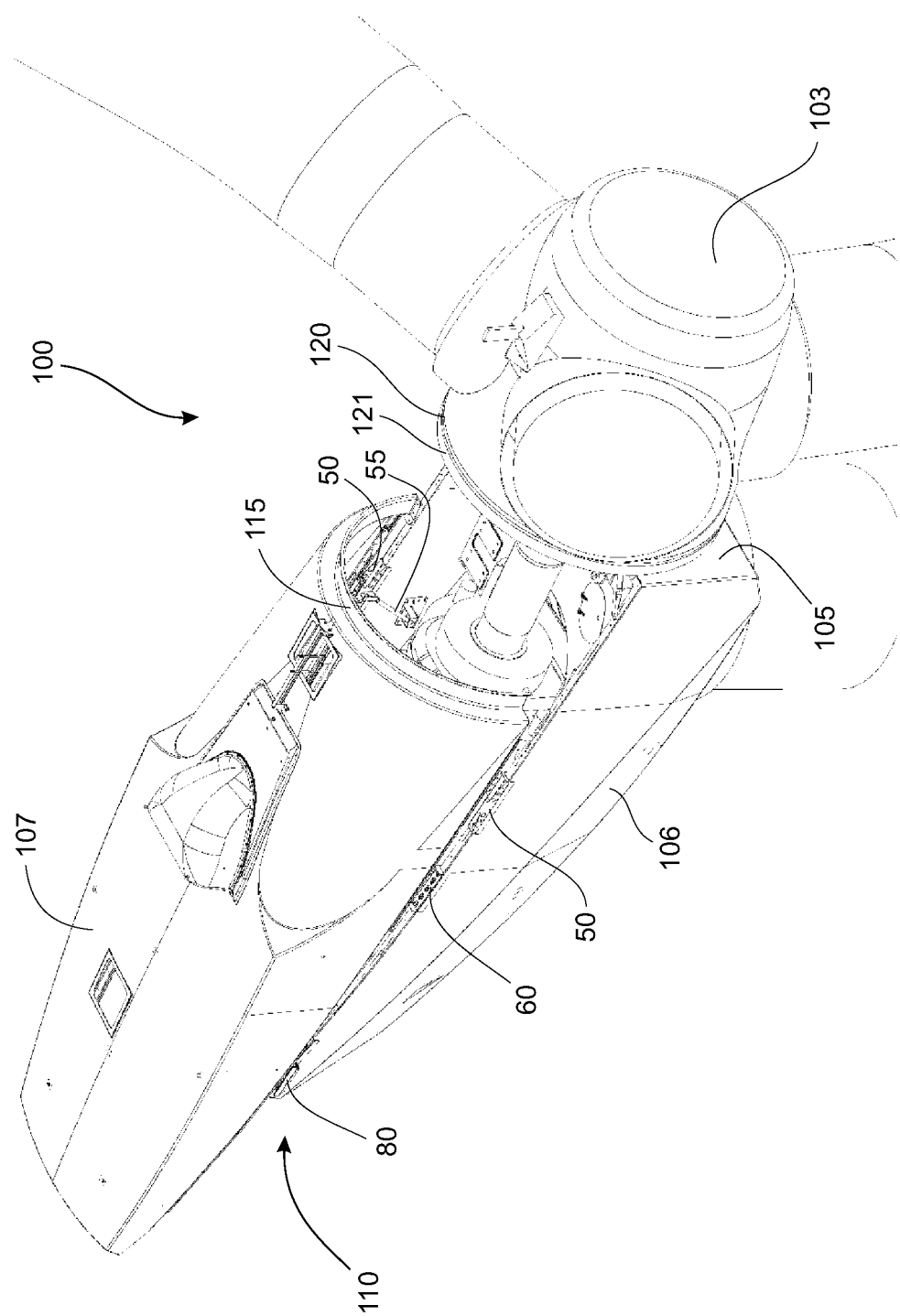
FIG. 6A depicts the wind turbine of FIG. 5 with the top portion of the nacelle moved further rearwardly to provide access from above to turbine components in the nacelle.
Figure 6B:
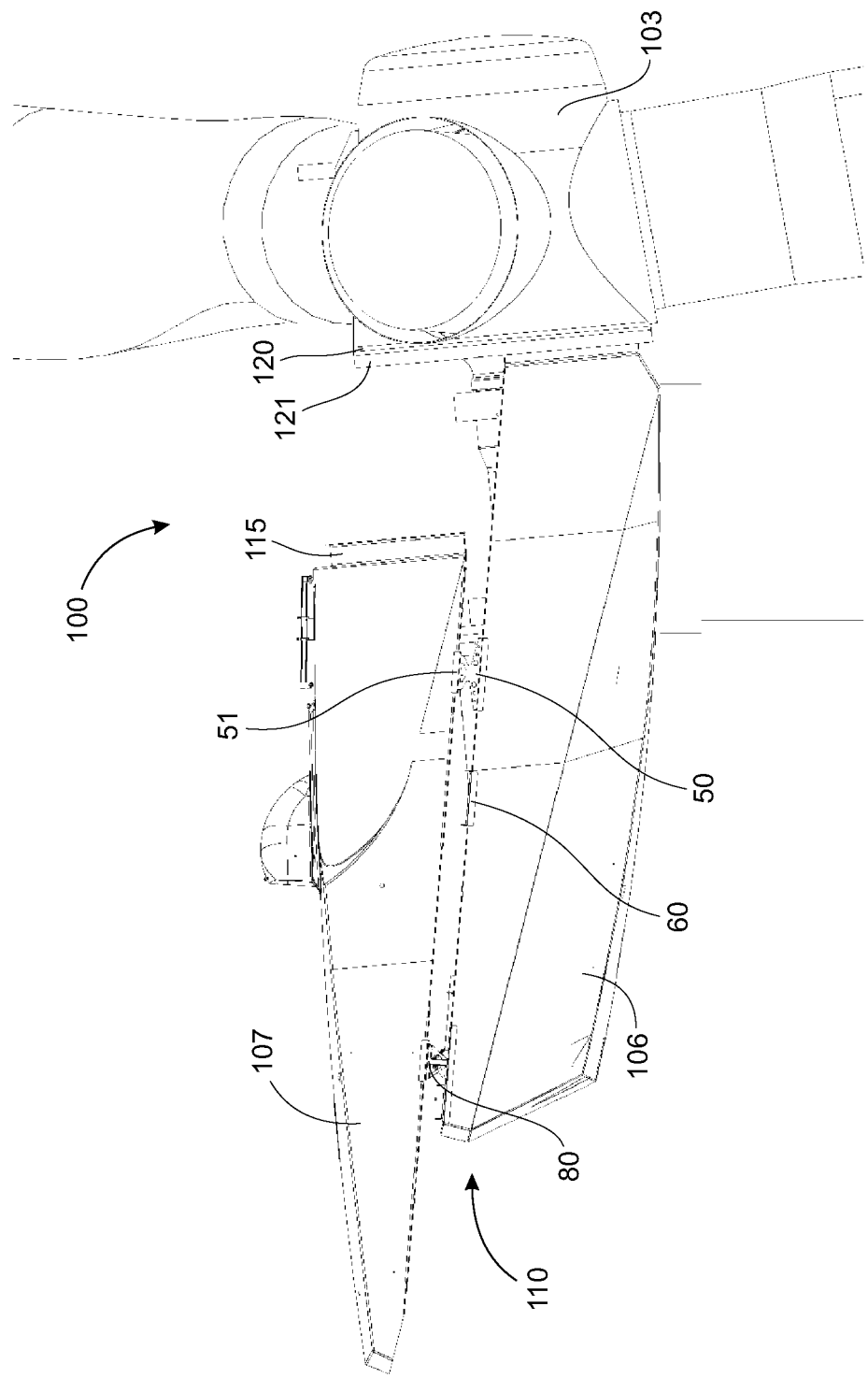
FIG. 6B depicts a side view of FIG. 6A.
Figure 7A:
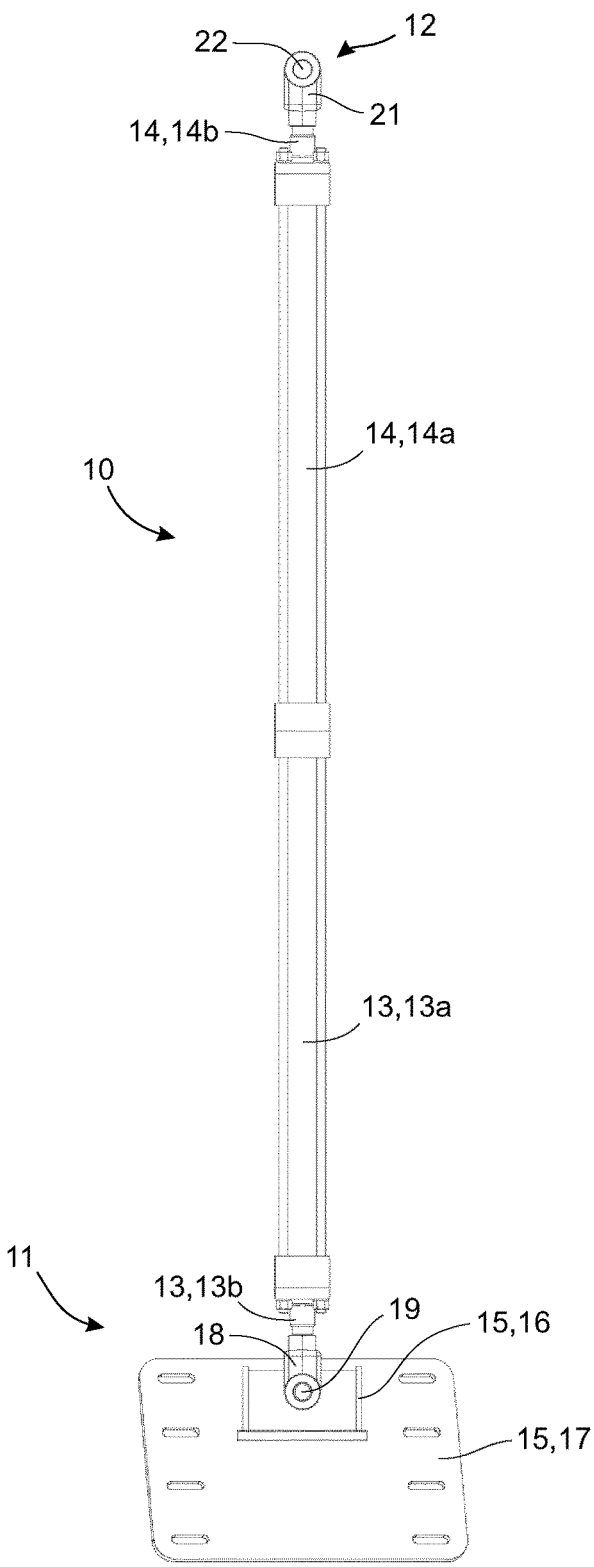
FIG. 7A depicts a side view of one of the jacks shown in FIG. 2A, the jack in a retracted configuration.
Figure 7B:
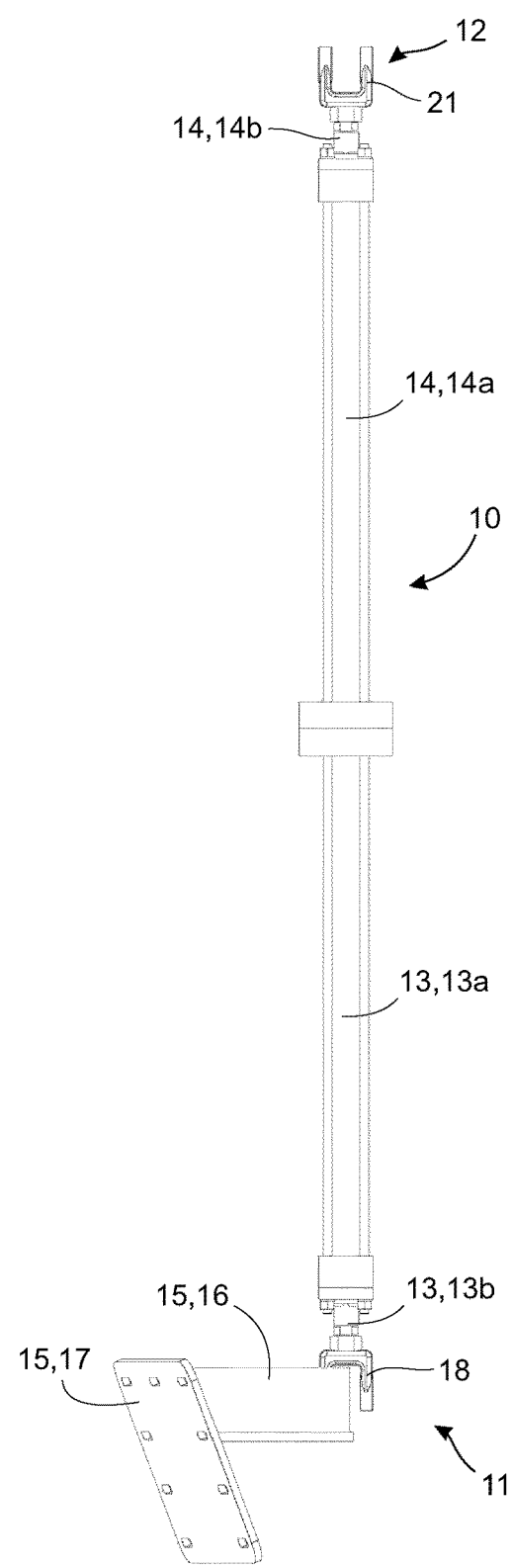
FIG. 7B depicts a front view of the jack of FIG. 7A.

Referring to FIG. 2A, FIG. 2B, FIG. 2C, FIG. 3, FIG. 4, FIG. 5, FIG. 6A and FIG. 6B, a process of opening the nacelle 101 using the lift system 1 to provide access from above to the turbine components in the nacelle 101 is depicted. The lift system 1 is first installed as described above in connection with FIG. 2A, FIG. 2B and FIG. 2C. As seen in FIG. 3, after installation of the lift system 1 is completed, the act of extending the jacks 10 to lift the rear of the top portion 107, for example by about 2 m, caused a U-shaped bracket 115 at the front of the top portion 107 to unhook from a complementary U-shaped bracket 121 formed on the rotor fairing 120 at a back end of the rotor hub 103. As seen in FIG. 4, an operator is then able to shift the top portion 107 about 6-12 inches rearward so that the U-shaped bracket 115 clears the rotor hub 103. FIG. 9A, FIG. 9B, FIG. 9C FIG. 9D and FIG. 9E provide more detailed views of the process of unhooking the U-shaped brackets 115, 121 and moving the top portion 107 about 6-12 inches rearward so that the U-shaped bracket 115 clears the rotor hub 103. The operator is able to move the top portion 107 about 6-12 inches because of the lateral horizontal pivoting connections between the jacks 10 and the nacelle 101 (both the top portion 107 and the bottom portion 106) and between the support frame 30 and the nacelle 101 (both the top portion 107 and the bottom portion 106). As seen in FIG. 5, after shifting the top portion 107 about 6-12 inches rearward, the rear of the top portion 107 is then lowered by retracting the jacks 10 until the bottom rim 108 of the top portion 107 comes to rest on the rollers 51 of the roller carriages 50 and the sliding plates 80. An arrangement of chains with chain binders (not shown) is then utilized to brace the top portion 107 of the nacelle 101 from the inside of the nacelle 101 to prevent the top portion 107 from flying off in a strong wind gust. The jacks 10 and the support frame 30 are then disconnected from the top portion 107 via the pinned connections. As seen in FIG. 6A and FIG. 6B, the top portion 107 of the nacelle 101 is then winched rearward along the rollers 51 of the carriages 50. Winching is accomplished by alternately loosening and tightening certain of the chains in the arrangement of chains with chain binders that was installed (not shown). The top portion 107 is winched as far rearward as is necessary to access from above the desired turbine component in the nacelle 101.

To reconnect the top portion 107 to the rotor hub 103, the process is reversed, whereby: the top portion 107 is winched forward until the U-shaped bracket 115 is 6-12 inches away from the complementary U-shaped bracket 121; the jacks 10 and support frame 30 are re-pinned to the top portion 107; the rear of the top portion 107 is raised by the jacks 10 to tilt the front portion 107 so that the front of the top portion 107 is down; the top portion 107 is moved forward so that the U-shaped bracket 115 is aligned for connection with the complementary U-shaped bracket 121; the roller carriages 50, the spacers 60 and the sliding plates 80 are dismounted from the bottom portion 106; and, the rear of the top portion 107 is lowered by the jacks 10 so that the U-shaped bracket 115 and the complementary U-shaped bracket 121 are once again connected and the bottom rim 108 of the top portion 107 and the top rim 109 of the bottom portion 106 are once again mated. The rims 108, 109 are then bolted together and the remaining elements of the lift system 1 dismounted from within the nacelle 101.

Referring to FIG. 7A to FIG. 7D, details of one of the jacks 10 are depicted. The jack 10 comprises lower and upper actuators 13, 14, respectively, for example hydraulic cylinders, pneumatic cylinders, linear actuators and the like, attached to one another at actuator barrels 13a, 14a, respectively, to provide sufficient combined length of the actuator barrels 13a, 14a and stroke length of respective actuator rods 13b, 14b.

The lower actuator 13 is pivotally attached to a lower jack mount 15, the lower jack mount 15 comprising a lower jack mounting bracket 16 to which the lower actuator 13 is pivotally attached and a lower jack mounting plate 17 on which the lower jack mounting bracket 16 is mounted. For strength, the lower jack mounting bracket 16 and the lower jack mounting plate 17 are monolithic. The lower actuator 13 comprises a clevis 18 having opposed apertures and the lower jack mounting bracket 16 comprises at least one corresponding aperture through which a lower jack pin 19 may be inserted to pivotally connect the lower actuator 13 to the lower jack mounting bracket 16. The apertures are aligned in a horizontal and lateral direction so that the lower actuator 13 can pivot about a lateral horizontal pivot axis through the lower jack pin 19, thereby permitting the top end 12 of the jack 10 to translate longitudinally. The lower jack mounting plate 17 is secured, for example with bolts, to the bottom portion 106 of the nacelle 101.

The upper actuator 14 comprises a clevis 21 having opposed apertures that may be aligned with at least one aperture in a mounting structure on the underside of the top portion 107. An upper jack pin 22 may be inserted through the aligned apertures to pivotally attach the upper actuator 14 to the underside of the top portion 107. The apertures are aligned in a horizontal and lateral direction so that the upper actuator 14 can pivot about a lateral horizontal pivot axis through the upper jack pin 22, thereby permitting the top end 12 of the jack 10 to translate longitudinally when the top portion 107 is moved longitudinally to disconnect and reconnect the top portion 107 from and to the hub 103. The mounting structure on the underside of the top portion 107 to which the upper actuator 14 is preferably at a designated lifting point used to attach a crane when the nacelle 101 is originally installed on the wind turbine 100.

Referring to FIG. 8A and FIG. 8B, details of the support frame 30 are depicted. The support frame 30 has the two legs 33 extending angularly downwardly from the mounting collar 34 to provide the support frame 30 with an inverted V-shape with the mounting collar 34 at the apex. The upwardly oriented strut 35 extends through and is releasably secured in the mounting collar 34 by a pin 36. The pin 36 may be removed so that the upwardly oriented strut 35 can be adjusted vertically to accommodate the height of the top portions of different types of nacelles. The upwardly oriented strut 35 comprises a clevis 37 at the top end 32, the clevis 37 having opposed apertures that may be aligned with at least one aperture in a mounting bracket on the underside of the top portion 107. An upper support frame pin 38 may be inserted through the aligned apertures to pivotally attach the upwardly oriented strut 35 to the underside of the top portion 107. The apertures are aligned in a horizontal and lateral direction so that the upwardly oriented strut 35 can pivot about a lateral horizontal pivot axis through the upper support frame pin 38, thereby permitting the top end 32 of the strut 35 to pivot around the support frame pin 38 when the top portion 107 is moved longitudinally to disconnect and reconnect the top portion 107 from and to the hub 103. The legs 33 comprise feet 39 that are pivotally mounted on the bottom portion 106 of the nacelle 101. At the feet 39, the legs 33 are pivotally connected to lower leg mounts 41, the lower leg mounts 41 comprising lower leg mounting brackets 42 and lower leg mounting plates 43 on which the lower leg mounting brackets 42 are mounted. For strength, each lower leg mount 41 is monolithic. The lower leg mounting brackets 42 comprise clevises aligned with at least one aperture in the feet 39 of the corresponding legs 33 through which lower support frame pins 44 may be inserted to pivotally secure the legs 33 to the lower leg mounting brackets 42. The apertures are aligned in a horizontal and lateral direction so that the legs 33 can pivot about a lateral horizontal pivot axis through the lower support frame pin 44, thereby permitting the top end 32 of the upwardly oriented strut 35 to pivot around the support frame pin 38 without locking up the support frame 30. The lower leg mounting plates 43 are secured, for example with bolts, to the bottom portion 106 of the nacelle 101.

Figure 9A:
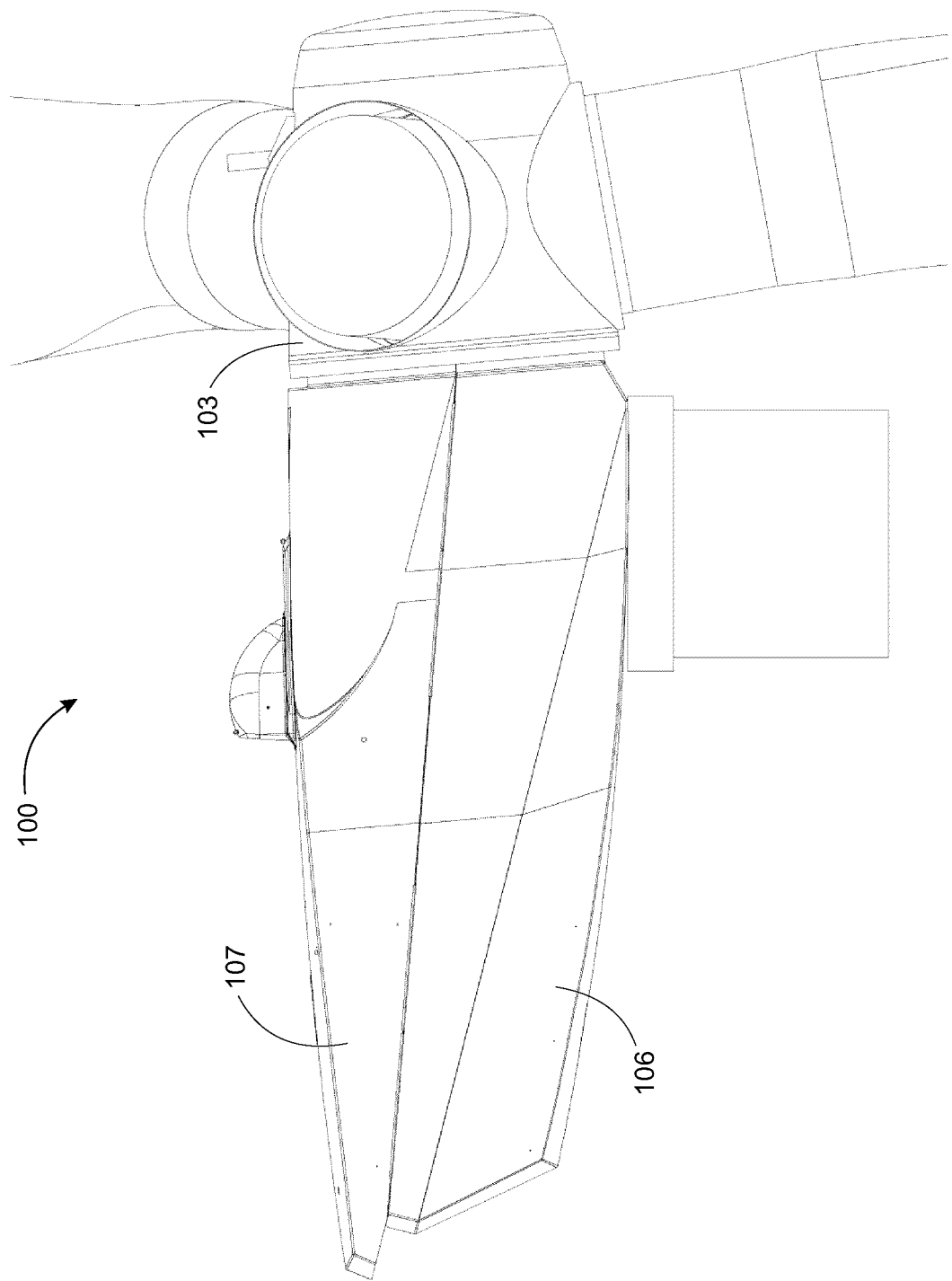
FIG. 9A depicts a side view of the wind turbine of FIG. 1.
Figure 9B:
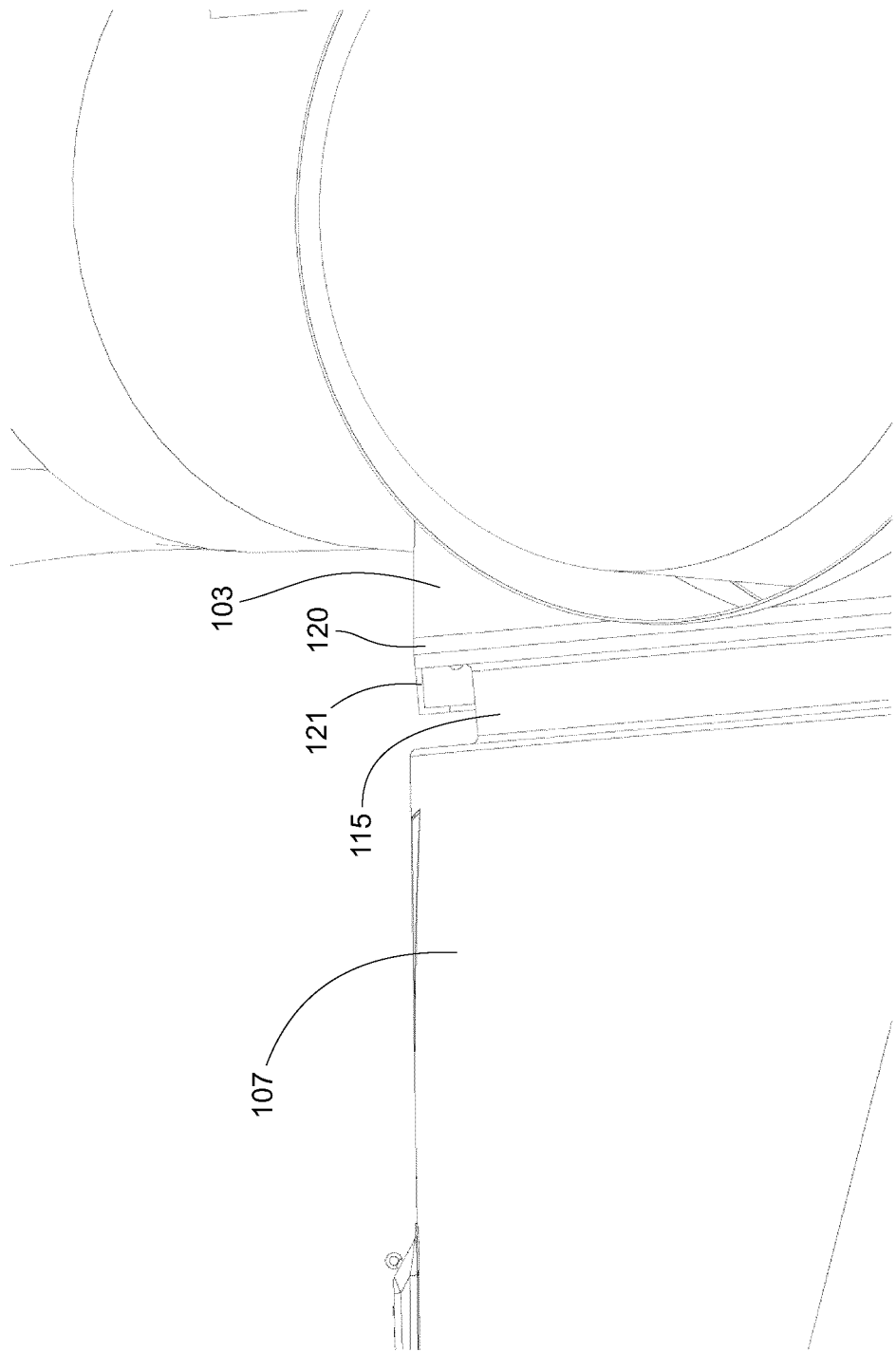
FIG. 9B depicts a magnified view of FIG. 9A more clearly showing a connection between the top portion of the nacelle and the lip of the rotor fairing on a hub of the wind turbine.
Figure 9C:
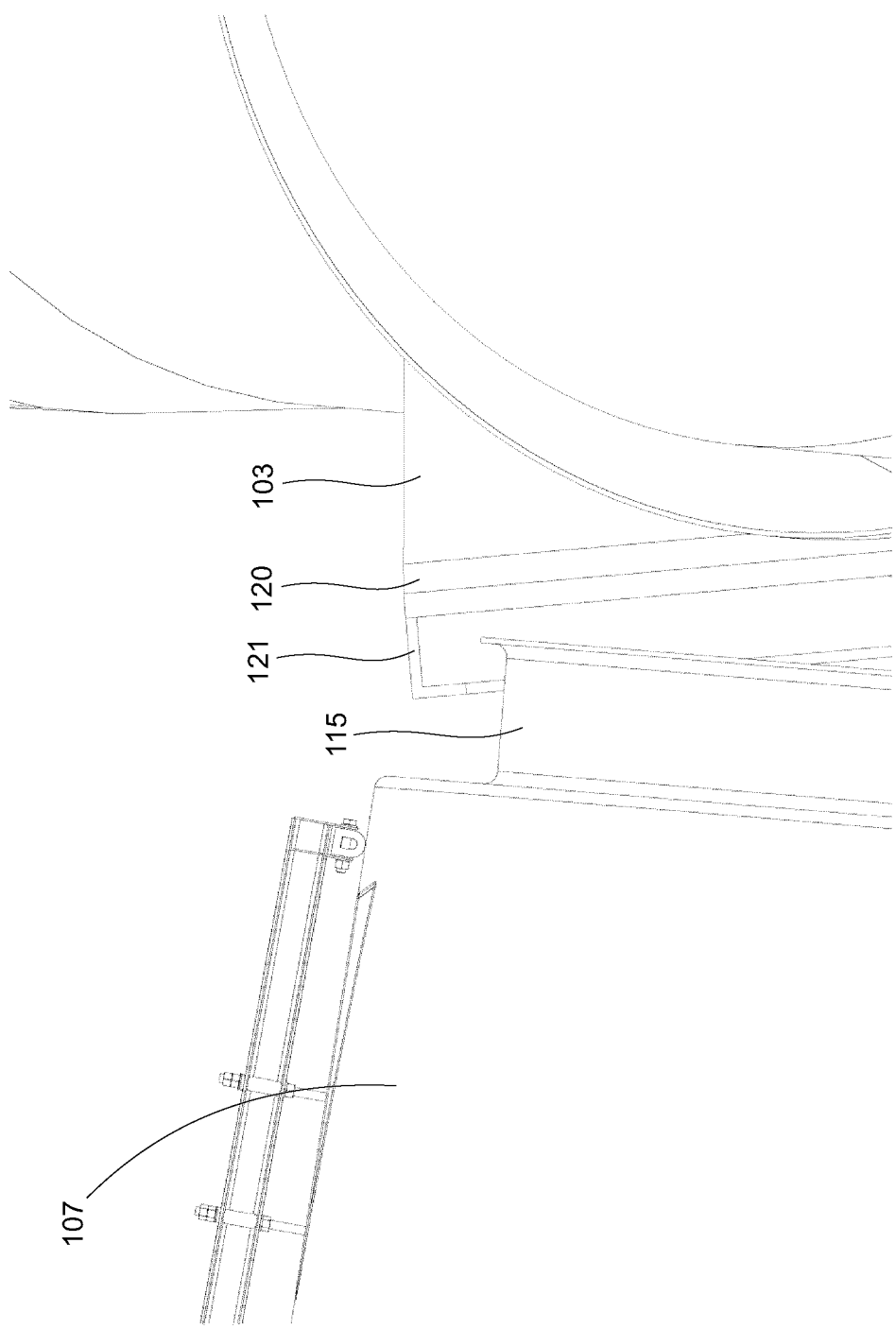
FIG. 9C depicts the connection shown in FIG. 9B after the rear end of the top portion has been raised, illustrating disconnection of the top portion of the nacelle from the hub.
Figure 9D:
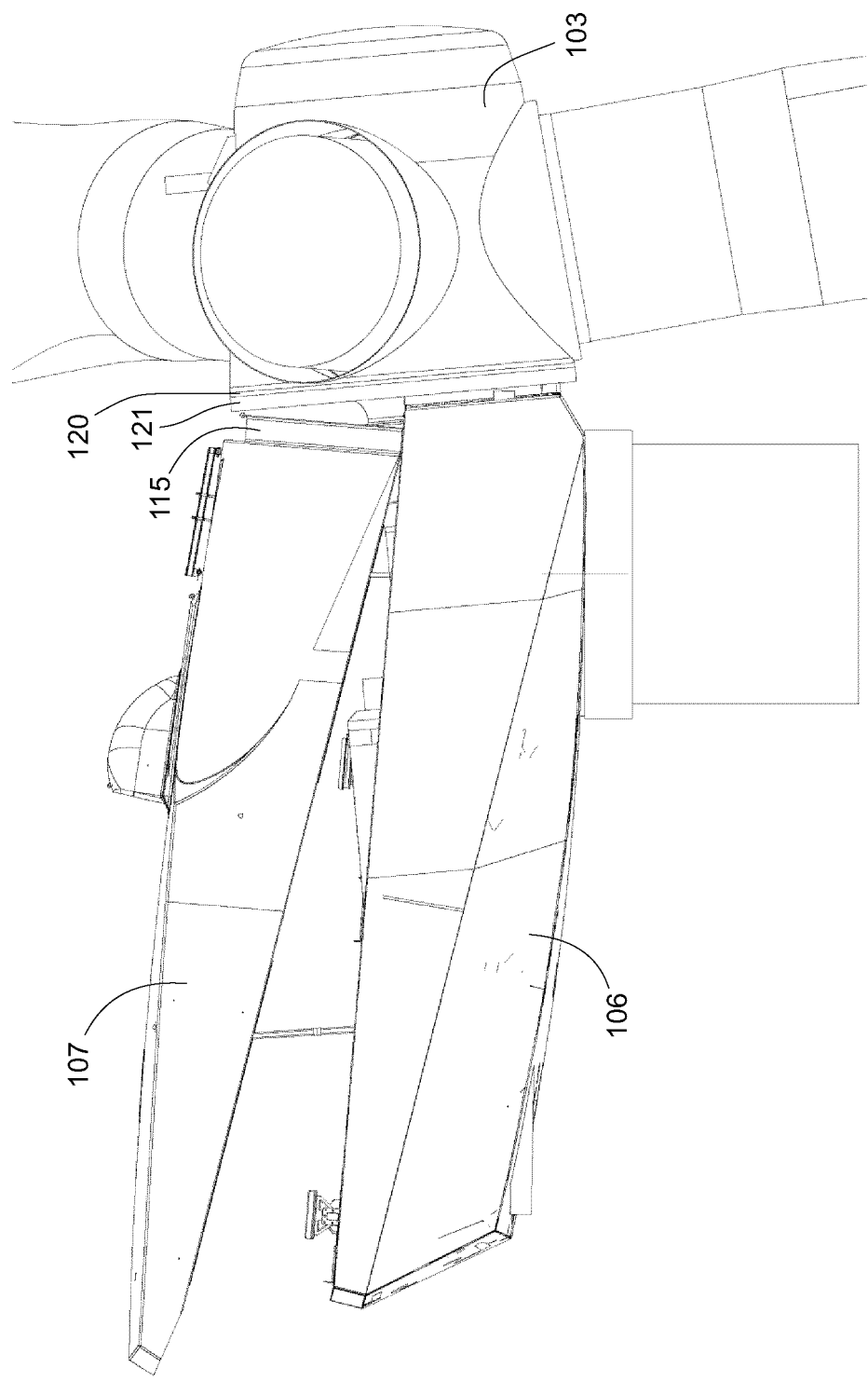
FIG. 9D depicts the wind turbine of FIG. 9A with the rear end of the top portion raised and the top portion moved rearwardly by about 6 inches so that the U-shaped lip on the front of the top portion is clear of the complementary inverted U-shaped lip of the rotor fairing; and, FIG. 9E depicts a magnified view of FIG. 9D showing the U-shaped lip on the front of the top portion clear of the complementary inverted U-shaped lip of the rotor fairing.
Figure 9E:
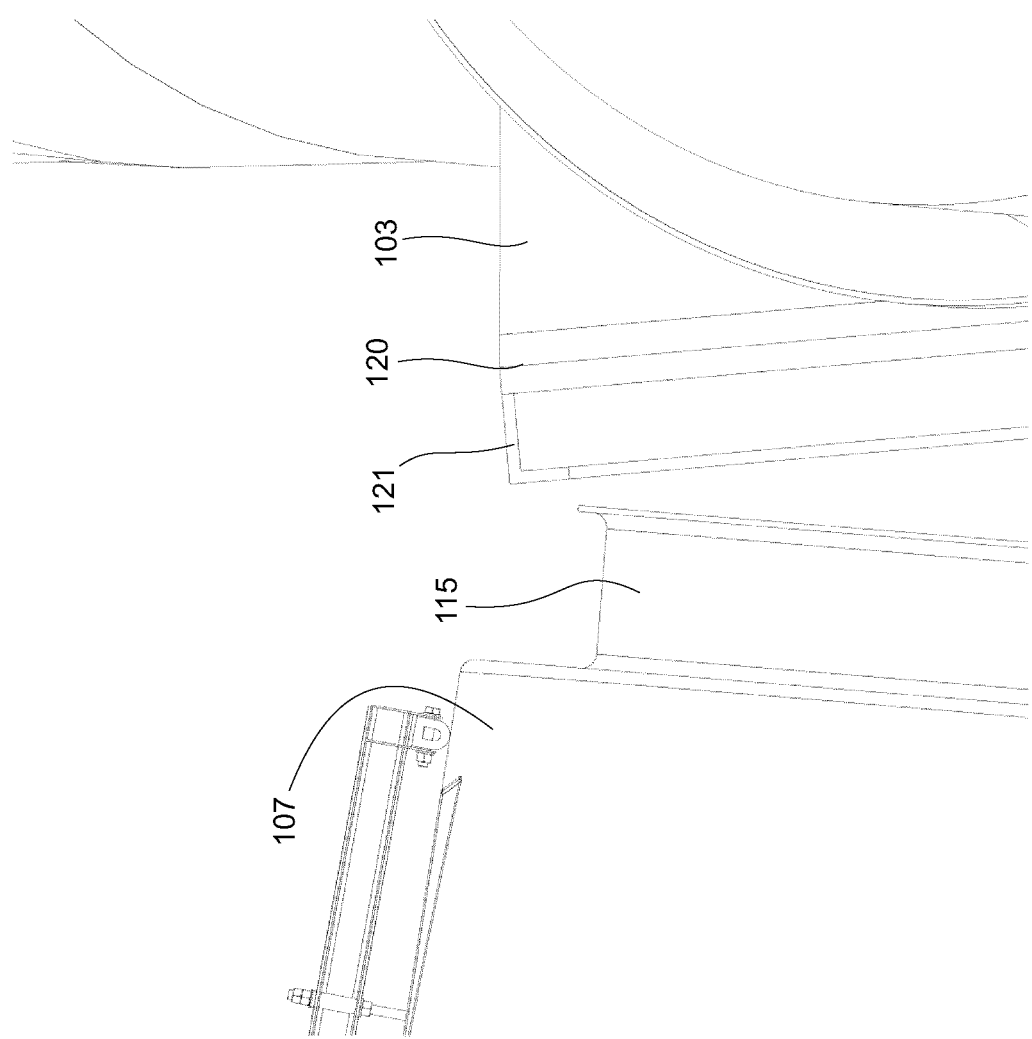

Referring to FIG. 9A to FIG. 9E, details of the connection between the openable top portion 107 of the nacelle 101 and the rotor hub 103 are depicted. The front of the top portion 107 comprises a U-shaped lip 115 into which a complementary inverted U-shaped lip 121 of a rotor fairing 120 on the rotor hub 103 of the wind turbine 100 is inserted, as seen in FIG. 9A and FIG. 9B. The connection between the U-shaped lips 115, 121 latches the top portion 107 of the nacelle 101 to the rotor hub 103 and also provides a rain seal for the nacelle 101 under normal working conditions. When the rear of the top portion 107 is raised, the top portion 107 is tilted with the front down, which disconnects the U-shaped lip 115 at the front of the top portion 107 from the complementary U-shaped lip 121 of the rotor fairing 120 on the rotor hub 103, as best seen in FIG. 9C. After tilting the top portion 107, the top portion 107 is shifted rearward about 6-12 inches as seen in FIG. 9D and FIG. 9E, which results in the U-shaped lip 115 at the front of the top portion 107 clearing the complementary U-shaped lip 121 of the rotor fairing 120. The rear of the front portion 107 can then be lowered without the U-shaped lip 115 connecting to the complementary U-shaped lip 121 so that the front portion 107 can be winched further rearward to provide access from above to the turbine components in the nacelle 101.

Thus, the combination of the jacks 10, the support frame 30 and the various laterally horizontally pinned connections provides for tilting and a small amount of rearward translation of the top portion 107 of the nacelle 101 to enable unhooking and separation the top portion 107 from the hub 103.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A lift system for opening an openable top portion of a nacelle of a wind turbine, the lift system comprising:
    first and second laterally spaced apart jacks pivotally connectable to a bottom portion of the nacelle inside the nacelle and pivotally connectable to the top portion of the nacelle proximate a rear end of the nacelle, the first and second jacks actuatable to raise and lower a rear of the top portion of the nacelle relative to the bottom portion of the nacelle; and,
    a support member pivotally connectable to the bottom portion of the nacelle and pivotally connectable to the top portion of the nacelle proximate a front end of the nacelle, a front of the top portion of the nacelle pivotable on the support member when the first and second jacks are actuated to raise or lower the rear of the top portion.

2. The lift system of claim 1, wherein the jacks and the support member are pivotally connectable to the bottom and top portions by laterally and horizontally oriented pivot pins.

3. The lift system of claim 1, wherein the jacks are pivotally connectable to an underside of the top portion at laterally spaced apart positions and the support member is pivotally connectable to the underside of the top portion at a single position.

4. The lift system of claim 1, wherein the support member is a support frame comprising a mounting collar, two legs connected to the mounting collar and an upwardly oriented strut connected to the mounting collar,
    wherein the legs are connected to and extend angularly downwardly from the mounting collar and the legs have bottom ends that are pivotally connectable to the bottom portion of the nacelle at laterally spaced apart locations, and
    wherein the strut extends upwardly from the mounting collar and the strut has a top end that is pivotally connectable to the top portion of the nacelle.

5. The lift system of claim 4 wherein the strut is releasably secured in the mounting collar so that a vertical position of the strut is adjustable.

6. The lift system of claim 1, further comprising rollers mountable on a top rim of the bottom portion to receive a bottom rim of the top portion when the rear of the top portion is lowered, the rollers further permitting longitudinal translation of the top portion when the bottom rim of the top portion is supported on the rollers.

7. The lift system of claim 6, wherein the rollers are comprised in roller carriages mountable on the top rim of the bottom portion, wherein the roller carriages comprise retainers securely mountable on the bottom portion of the nacelle, which pivotally connect the roller carriages to the bottom portion to hold the roller carriages on the top rim of the bottom portion while permitting the roller carriages to translate along the top rim.

8. The lift system of claim 1, further comprising sliding plates mountable on a top rim of the bottom portion proximate a rear of the bottom portion, the sliding plates receiving a bottom rim of the top portion when the rear of the top portion is lowered, the sliding plates further permitting longitudinal translation of the top portion when the bottom rim of the top portion is supported on the sliding plates.

9. A method of opening a nacelle of a wind turbine, the nacelle having an openable top portion and having either a substantially rectangular shape or a non-rectangular shape, the method comprising:

installing first and second jacks inside the nacelle proximate a rear of the nacelle by pivotally connecting the jacks to a bottom portion and the top portion of the nacelle at laterally spaced apart positions in the nacelle;

installing a support member inside the nacelle proximate a front of the nacelle by pivotally connecting the support member to the bottom portion and pivotally connecting the support member to the top portion in the nacelle;

disconnecting the top portion from the bottom portion along complementary rims of the top and bottom portion;

operating the jacks to lift a rear of the top portion relative to the bottom portion thereby causing a front of the top portion to pivot on the support member to tilt the top portion; and, shifting the top portion rearward.

10. A method of opening a nacelle of a wind turbine, the nacelle having an openable top portion connected to a rotor hub through complementary connecting brackets, the method comprising:

installing first and second jacks inside the nacelle proximate a rear of the nacelle by pivotally connecting the jacks to a bottom portion and the top portion of the nacelle at laterally spaced apart positions in the nacelle;

installing a support member inside the nacelle proximate a front of the nacelle by pivotally connecting the support member to the bottom portion and pivotally connecting the support member to the top portion in the nacelle;

disconnecting the top portion from the bottom portion along complementary rims of the top and bottom portion;

operating the jacks to lift a rear of the top portion relative to the bottom portion thereby causing a front of the top portion to pivot on the support member to tilt the top portion thereby causing the complementary connecting brackets to disconnect; and, shifting the top portion rearward after the complementary connecting brackets are disconnected.

11. The method of claim 10, wherein the complementary connecting brackets comprise a first U-shaped lip on the front of the top portion of the nacelle and a second U-shaped lip on a rotor fairing at a rear of the rotor hub.

12. The method of claim 9, wherein the jacks and the support member are pivotally connected to the bottom and top portions by laterally and horizontally oriented pivot pins.

13. The method of claim 9, wherein the jacks are pivotally connected to an underside of the top portion at the laterally spaced apart positions and the support member is pivotally connected to the underside of the top portion at a single position.

14. The method of claim 9, wherein after the top portion is tilted, the method further comprises installing rollers on the rim of the bottom portion, and wherein after the top portion is shifted rearward, the method further comprises lowering the rear of the top portion so that the rim of the top portion rests on the rollers.

15. The method of claim 14, further comprising moving the top portion rearward on the rollers to more fully open the nacelle.

16. The method of claim 9, wherein after the top portion is tilted, the method further comprises installing sliding plates on the rim of the bottom portion proximate a rear of the bottom portion, and wherein after the top portion is shifted rearward, the method further comprises lowering the rear of the top portion so that the rim of the top portion rests on the sliding plates.

17. The method of claim 9, wherein the support member is a support frame comprising a mounting collar, two legs connected to the mounting collar and an upwardly oriented strut connected to the mounting collar, wherein the legs are connected to and extend angularly downwardly from the mounting collar and the legs have bottom ends that are pivotally connected to the bottom portion of the nacelle at laterally spaced apart locations, and wherein the strut extends upwardly from the mounting collar and the strut has a top end that is pivotally connected to the top portion of the nacelle.

18. The method of claim 17 wherein the strut is releasably secured in the mounting collar so that a vertical position of the strut is adjustable.

* * * * *